United States Patent [19]

Sanderson et al.

[11] Patent Number: 4,564,856
[45] Date of Patent: Jan. 14, 1986

[54] APPARATUS PROVIDING AUTOMATIC AND MANUAL CONTROL OF SETUP ADJUSTMENTS FOR TV CAMERAS

[75] Inventors: Gary M. Sanderson; Charles M. White, both of Quincy, Ill.

[73] Assignee: Harris Corporation, Melbourne, Fla.

[21] Appl. No.: 252,474

[22] Filed: Apr. 9, 1981

[51] Int. Cl.⁴ .............................................. H04N 5/232
[52] U.S. Cl. ..................................... 358/10; 358/168;
358/169; 358/174; 358/224; 354/209; 352/141;
455/234
[58] Field of Search ..................... 358/10, 21, 41, 185,
358/199, 209, 210, 288, 168, 169, 218, 174, 219,
224, 227, 228, 160–164; 315/387; 352/140, 141,
142; 354/209; 455/219, 232, 234, 239, 240, 245,
250, 257

[56] References Cited

U.S. PATENT DOCUMENTS

| 2,281,693 | 5/1942 | Holst | 455/245 |
| 3,176,238 | 3/1965 | Dickerson | 455/234 |
| 3,315,034 | 4/1967 | White | 358/219 |
| 4,158,208 | 1/1979 | Dischert | 358/10 |
| 4,190,863 | 2/1980 | Dischert et al. | 358/210 |
| 4,365,272 | 12/1982 | Nagai | 358/228 |

OTHER PUBLICATIONS

Auto Beam Current Optimizer "IC" For Improvement of Latitude in Hand Held TV Camera, NHK Laboratories Note, Sep., 1978.
Auto Facilities of the Mark IX Camera, Commun & Broadcast, (GB), vol. 4, No. 3 (Summer, 1978) pp. 4–11.

Primary Examiner—Tommy P. Chin
Attorney, Agent, or Firm—Yount & Tarolli

[57] ABSTRACT

Apparatus for automatically and/or manually controlling setup of a device such as a color television camera. The system includes a closed loop automatic setup system which provides at least one setup control signal to the camera and, during a specific automatic setup operation, responds to at least one video signal provided by the camera to automatically adjust the level of the setup control signal. A manual control is also provided which permits manual variation of the level established by the auto setup system. In addition, apparatus is included for disabling the manual control during the automatic setup operation so that at that time the setting of the manual control does not influence the level of the setup control signal. The apparatus is also operable in fully automatic and fully manual modes.

18 Claims, 4 Drawing Figures

4,564,856

APPARATUS PROVIDING AUTOMATIC AND MANUAL CONTROL OF SETUP ADJUSTMENTS FOR TV CAMERAS

BACKGROUND AND FIELD OF THE INVENTION

The present invention relates to automatic control apparatus such as TV camera auto setup systems, and particularly sets forth a TV camera setup system permitting manual readjustment of automatically established settings.

State of the art television cameras, particularly color television cameras, are highly complex instruments having an elaborate array of controls which must be critically adjusted in order for the camera to operate satisfactorily. Correctly adjusting (or "setting up") the camera is a prodigious and time consuming task requiring substantial skill, experience, and patience. Camera setup is emminently well-suited for automation, and indeed recently there have appeared automatic setup systems for TV cameras. These automatic setup systems utilize microprocessors for monitoring the video signals provided by the TV camera and for automatically establishing the proper setup adjustments in response thereto.

Such automatic setup systems adjust the settings to arrive at those settings which produce the best overall picture. In specific instances it may be desirable to adjust the controls differently, however. More specifically, an automatic registration setup system is generally designed to adjust the registration so that the best registration is found near the center of the subsequently displayed picture. This is because normally the viewers attention is directed toward the center of the screen. In certain instances, for example during the taping of commercials, it may be desirable to achieve best registration at a point on the screen other than the center. It may similarly be desirable to change other settings established by the automatic setup system to conform with the needs of the specific use of the camera.

One known automatic setup system includes manual controls in addition to the automatic setup system. The output of each of the manually adjustable controls is combined with the corresponding output of the automatic setup system so as to provide a control signal which is adjustable both manually and automatically. A difficulty with this approach is that the manual controls are continually coupled in with the automatic setup controls. The manual control signals are therefore included within the closed loop of the automatic setup system during automatic setup of the TV camera. Consequently, for proper operation the manual controls must be centered before the auto setup operation takes place. Restriction of the range of manual variation could occur if one of the manual controls were set near one of its operating limits during the automatic setup operation, since the auto setup system will "adjust out" the manual signal during auto setup.

SUMMARY OF THE INVENTION

It is an object of the present invention to provide an improved control system permitting both automatic setup of operation and manual readjustment thereafter.

It is another object of the present invention to provide an automatic setup system for TV cameras wherein the above-mentioned problems with the prior art did not occur.

It is an additional object of the present invention to provide a TV camera setup system including manual and automatic controls where the manual controls are disengaged from operation during the automatic setup of the camera.

It is still another object of the present invention to provide an automatic setup system employing both manual and automatic controls and having various modes of operation permitting strictly manual operation, strictly automatic operation, or automatic operation with manual control of the automatically established settings.

In accordance with one aspect of the present invention apparatus is provided for setting up a television camera. This apparatus includes a closed loop auto setup system which provides at least one setup control signal to the camera and, during an automatic setup operation, responds to at least one video signal provided by the camera to automatically adjust the level of the setup control signal, a manual control which permits manual variation of the level established by the auto setup system, and means for disabling the manual control during the automatic setup operation so that at that time the setting of the manual control does not influence the level of the setup control signal.

In accordance with another aspect of the present invention, apparatus is disclosed for providing a control signal for adjusting a controlled device, such as a TV camera, wherein the apparatus comprises first means for providing an automatically adjustable control signal, second means for providing a manually adjustable control signal, and third means for combining the automatically adjustable signal with the manually adjustable signal to provide a combined signal, and for providing the combined signal for use as the control signal for adjusting the controlled device, wherein the third means includes means for providing the automatically adjustable control signal in place of the combined signal when the first means is adjusting the automatically adjustable signal, whereby the control signal substantially corresponds to the automatically adjustable control signal alone during the automatic adjustment of the control device.

BRIEF DESCRIPTION OF THE DRAWINGS

The foregoing and other objects and advantages of the present invention will become more readily apparent from the following detailed description, as taken in conjunction with the accompanying drawings, wherein.

DETAILED DESCRIPTION

Figure 1:
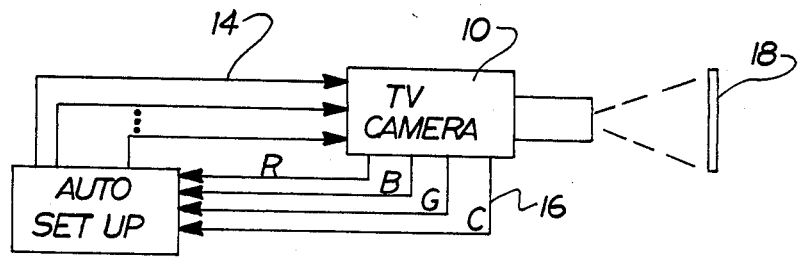
FIG. 1 is a broad block diagram representing the interactions between a TV camera and an automatic setup control unit for that camera.

Referring first to FIG. 1, there is shown a TV camera 10 interconnected with an automatic setup control unit 12. The automatic setup unit 12 provides a plurality of control signals on output lines 14 for controlling the operation of the TV camera 10. The controlled functions includes beam, focus, registration, centering, size, linearity, white and black levels, chroma balance, etc. Each of these functions is controlled by a corresponding one of the control signals provided along the output lines 14 of the automatic setup unit 12. During normal operation of the camera 10, these controls signals will remain fixed. Prior to normal use of the camera, however, the auto setup unit 12 will be engaged to automatically adjust the control levels in accordance with feedback signals provided by the TV camera 10. The feedback signals provided along the video output lines 16 include the individual video signals generated by the TV camera (in FIG. 1 shown as red, blue, and green video signals), as well as the composite video signal generated from these signals.

Commonly, the TV camera 10 will be directed towards a specific setup chart 18 configured so as to simplify the detection of errors in the various functions controlled by the auto setup unit 12. In many cases, the setup chart 18 is actually an integral part of the camera 10, and is coupled into the optics of the camera through an arrangement known generally as a pattern projector.

The auto setup unit 12 includes a microprocessor and suitable peripheral elements for processing the video feedback signals provided by the TV camera 10 to generate suitable inputs for the microprocessor and other peripheral elements for converting the digital output signals provided by the microprocessor into the control signals provided along the output lines 14. The microprocessor follows preprogrammed instructions to modify the control signals 14 in accordance with predetermined algorithms. The algorithms are selected to provide optimal overall picture adjustments during normal use of the camera. These algorithms may place exaggerated emphasis upon errors occurring within the center of the subsequently displayed image, since it is these areas to which a viewers attention is most often directed.

It is in many cases useful, however, to provide manual controls for "misadjusting" the adjustments previously established by the automatic setup system in order to enable critical adjustment of the control functions in accordance with different criteria. During the taping of commercials, for example, the product of interest may be located at a place substantially offset from the center of the screen, and hence somewhat spaced from the area in which adjustment has most nearly perfectly been made. It is clearly desirable in such a circumstance to readjust the setup controls to move the area of best adjustment to cover the product.

In the prior art, systems are known wherein manual signals are provided which are added together with the automatically established signals provided by the automatic setup unit 12. These manually adjustable signals are continually coupled into the auto setup loop. The automatic setup system, which is after all a closed loop, feedback controlled system, will adjust the control signal until the camera operates normally regardless of the actual settings of the manual controls. If the manual adjustment was set near the middle of its range of movement during the automatic setup, no problem arises. In that case manual adjustments by equal amounts on opposite sides of the nominal value are thereafter available. If, however, the manual control was located near one of its limits of movement during auto setup, the range of manual variation on one side of the nominal value would be degraded.

To avoid this problem, the present invention provides an automatic setup system permitting manual readjustment of the automatically established values, but where the manual adjustment signals are effectively disconnected from the system during automatic setup. The system therefore preserves the full range of manual variation about the nominal value when manual adjustment is desired.

Figure 2:
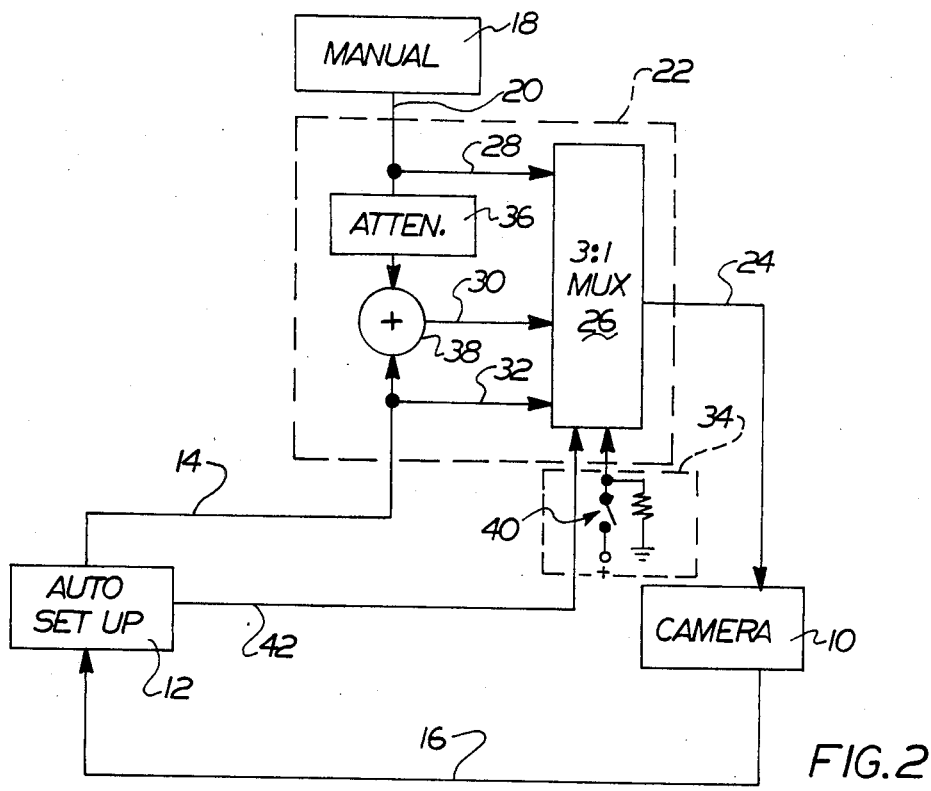
FIG. 2 is a broad block diagram illustrating generally the fashion in which the system of FIG. 1 is to be modified in accordance with the teachings of the present invention.

FIG. 2 is a broad block diagram schematically representing the principals of the present invention. As with the FIG. 1 embodiment, a camera 10 provides feedback signals along one or more feedback lines 16 to an automatic setup unit 12, which adjusts the signals it provides along a control path 14 so as to establish desired operation of the camera 10. (For simplicity, only one control path 14 and feedback path 16 are shown, although it will be appreciated that normally there are a large number of both.)

In accordance with the teachings of the present invention, the FIG. 2 embodiment also incorporates a circuit 18 for providing a manually adjustable control signal along an output line 20. A combining circuit 22 responds to the manually adjustable signal provided by the manual adjustment circuit 18 as well as the automatically established control signal provided along control path 14, combines these signals, and provides the combined signal along an output path 24 to the camera 10 for control thereof.

In the FIG. 2 embodiment, the combining circuit 22 includes an analog multiplexing circuit 26 which responds to multiple input signals provided along input lines 28, 30 and 32, and provides a selected one of these three input signals along the output line 24 to the camera 10. A selection circuit 34, to be described hereinafter, controls the multiplexer 26 and thus which of the three input signals is provided to the camera 10.

The signals provided along input lines 28 and 32 are the manually adjustable signal and the automatically adjustable signals, respectively. The signal provided along the input line 30, however, is a combination of these two signals. The combined signal is provided by analog adder circuit 38, which responds at one input to the automatically adjusted signal provided by the automatic setup circuit 12, and at the other input to the manually adjusted signal provided by the manual adjustment circuit 18 as attenuated by an attenuator 36.

The attenuator 36 is included to narrow the range of manual adjustment of the automatically adjusted signal. The signal provided by the manual adjustment circuit 18 varies over a range which is as great as the range over which the automatic setup signal 14 itself may vary, since in some circumstances the manually adjustable signal, alone, will be used to control the camera. If this signal were added directly to the automatically adjusted signal, the manual control would be too coarse; that is, a small readjustment of the manual control would produce too great a readjustment of the automatically adjusted signal. The attenuator 36 is therefore provided to attenuate this manually adjustable signal from that level to a much smaller level, providing a smaller range of adjustment of the automatically established signal provided by the auto setup unit 12. The combined signal along input line 30 therefore comprises mainly the automatically adjusted signal provided by the auto setup circuit 12, but readjusted by a small amount in accordance with the manually adjustable signal provided by the manual adjustment circuit 18.

By controlling the operation of the multiplexer 26, the output signal provided to the camera 10 can comprise either the manually adjustable signals, the automatically adjustable signal, or the combined signal (which, again, corresponds substantially to the automatically adjustable signal, manually readjustable over a small range by the manual adjustment circuit 18). The selection of which of these inputs is connected to the output line 24 is determined by the selection circuit 34. Selection circuit 34 includes a switch 40 which when closed, causes the multiplexer 26 to connect the input 28 to the output line 24, whereby the camera 10 is adjusted solely in accordance with a manually adjustable signal provided by the manual adjustment circuit 18. This would occur when, for example, the automatic setup system failed for some reason and manual setup of the camera was desired. When switch 40 is opened, however, the operation of the multiplexor 26 is controlled by a control signal generated by the automatic setup system 12. (It may, for example, be generated by the microprocessor associated with the auto setup circuit 12 or even by a switch coupled with the switch which causes the auto setup system to setup the camera.)

In the FIG. 2 embodiment, the automatic setup system 12 provides a control signal along an output line 42 which has a low logic level (logic "0") during automatic setup operations, and a high logic level (logic "1") thereafter. The multiplexer 26 responds to a low logic level on this input line by connecting the input line 32 to the output 24. Consequently, during the automatic variation of the control signals provided by the automatic setup system 12, the multiplexer 26 is configured so that these automatically adjustable signals, alone, control the operation of the camera 10. Upon the conclusion of the automatic setup operation, the signal provided along line 42 shifts to a high logic level, and the multiplexer 26 responds by providing the signal appearing at the input line 30 (i.e., the combined signal) upon the output line 24. Consequently, at that time the camera is controlled by the automatically established signal provided by the automatic setup circuit 12 (which remains constant following the conclusion of the automatic setup operations), as manually adjusted in accordance with the manual adjustment circuit 18.

Figure 3:
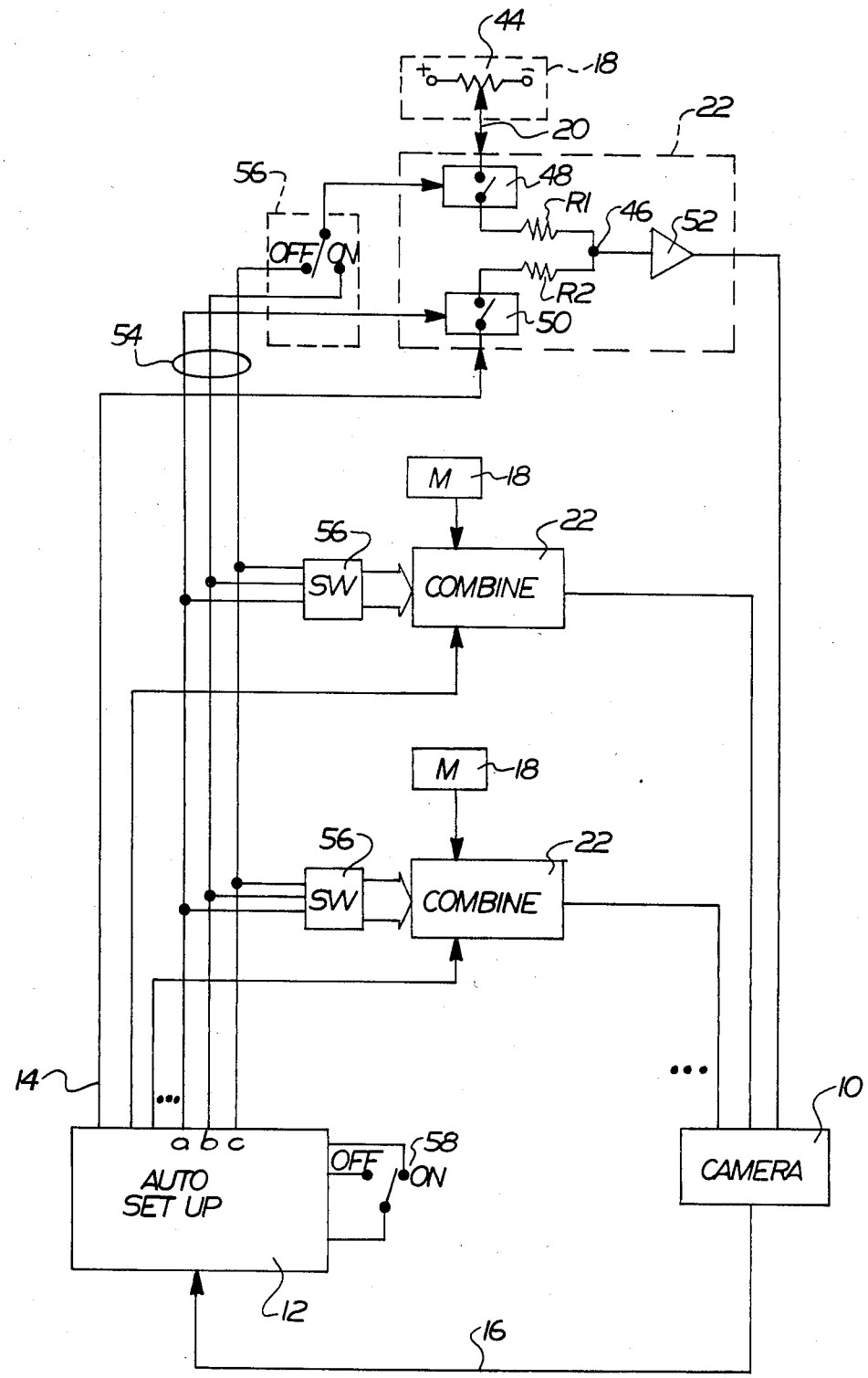
FIG. 3 is a more detailed diagram of another, and presently preferred embodiment of an automatic setup system for a TV camera in accordance with the teachings of the present invention.

FIG. 3 is a more detailed circuit schematic of a slightly different embodiment in accordance with the teachings of the present invention. As in the embodiment of FIG. 2, the FIG. 3 embodiment includes a camera 10 and an automatic setup unit 12. As stated previously, the automatic setup unit 12 provides a plurality of output signals along output lines 14 which are used to control the camera 10 and which are adjusted in accordance with feedback signals provided to the automatic setup unit 12 by the camera 10 over return lines 16. Also as with the embodiment of FIG. 2, the output signals provided along the output lines 14 of the automatic setup unit 12 are directed to combining circuits 22 where they are combined with manually adjustable signals provided by manually adjustable circuits 18. In FIG. 3, a manually adjustable circuit 18 is shown as a potentiometer 44 connected across a suitable voltage source. The wiper arm of the potentiometer 44 provides the manually adjustable signal which is supplied to the combining circuit 22.

In FIG. 3 the combining circuit 22 includes a resistive adder consisting of two resistors R1 and R2, each connected between a common node 46 and a corresponding switch 48 and 50, respectively. The switches 48 and 50 connect the output of the manual adjustment circuit 18 and the auto setup circuit 14, respectively, to their associated resistors R1 and R2. These switches have open and closed states providing very high and very low impedances, respectively. The voltage at the node 46 will be dependent upon the states of the two switches 48 and 50. When switch 50 is closed and switch 48 is open, the voltage at the node 46 will correspond with the automatically adjustable signal provided by the automatic setup unit 12, since the resistor R1 is essentially disconnected from the circuit. When, on the other hand, the switch 48 is closed and the switch 50 is open, the voltage at the node 46 will correspond to the manually adjustable signal provided by the manually adjustable circuit 18, since in this case resistor R2 is essentially open circuited.

When both switches 48 and 50 are closed, however, the voltage at the node 46 will be a combination of the manually adjustable and the automatically adjustable signal, in accordance with the following equation:

$$V_{node} = V_{manual}\left(\frac{R2}{R1 + R2}\right) + V_{auto}\left(\frac{R1}{R1 + R2}\right).$$

Since resistor R1 will normally be ten times greater than resistor R2, the voltage at the junction 46 will be predominantly the automatic adjustment signal, but will be manually variable from that level in accordance with the setting of the potentiometer 44.

The voltage at the node 46 is provided to the camera 10 through a buffer amplifier 52 having an input impedance which is much greater than either of resistors R1 and R2, so that its effect upon the voltage at the node 46 may be ignored.

From the foregoing it is apparent that the signal appearing at the output of the combiner circuit 22 is dependent upon the states of the two switches 48 and 50. These switches may be solid state analog switches, such as are readily available. Control of the states of these two switches 48 and 50 is analogous to control of the multiplexer 26 of the FIG. 2 embodiment. The states of these two switches is dependent upon the states of controls signals provided along a control bus 54, and upon the states of a switch 56 associated with that respective combiner circuit. The signals provided along the control bus 54 are generated by the automatic setup circuit in dependence upon the state of a bypass switch 58 and upon whether the automatic setup unit 12 is in the process of automatically setting up the camera 10. The control words for the various modes are as follows:

| Mode | a b c | function |
| --- | --- | --- |
| I | 0 1 1 | manual only |
| II | 1 0 0 | auto only |
| III | 1 1 0 | auto or tweak |

The first bit of the control word directly controls the state of the switch 50 of each combiner. The switch 48 of each combiner is connected to either the second or third bit of the control word, depending upon the state of the switch 56 associated with that combiner.

If the bypass switch 58 is in the ON position, then the auto setup circuit provides a three bit word "011" upon the three bit control bus 54. This causes the switch 50 of each combiner circuit 22 to be opened and the switch 48 of each combiner circuit to be closed, whereby the output of each combiner circuit corresponds to the manually adjustable control signal, alone.

When the bypass switch 58 is in the "off" position, however, the three bit control word provided on the control bus 54 will be either "100" or "110", depending upon whether the auto setup circuit 12 is engaged in auto setup of the camera 10, or not. When the auto setup circuit 12 is actively involved in adjustment of the automatically adjustable signal level in accordance with the feedback provided by the camera 10, the auto setup circuit 12 will provide a control word "100" which disables the manual input into each of the combiner circuits 22 whereby the camera 10 is then controlled by the auto setup circuit, alone. More particularly, when the control bus has the word "100" thereon, the switches 50 of each combiner circuit 22 will be closed and the switches 48 of each of the combiner circuits 22 will be opened, whereby the outputs of these combiner circuits will correspond with the automatically adjustable signals, alone.

Upon the conclusion of automatic adjustment of the automatically adjustable signals, the auto setup unit 12 will provide a control word "110" upon the control bus. This control word permits each of the combiner circuits 22 to provide either the automatically adjustable signal, alone, or the combined signal at its output, dependent upon the state of the corresponding "tweak" switch 56. When the corresponding "tweak" switch is in the "on" position, the switch 48 is controlled by the second bit of the control word, whereby the switch 48 is closed and the output of the combiner circuit corresponds to the combination of the manually adjustable signal and the automatically adjustable signal. When the tweak switch is in the "off" position, the switch 48 is instead controlled by the third bit of the control word, whereby the switch 48 will be open and the output will correspond with the automatically adjustable signal, alone.

This arrangement permits the operator to easily switch between automatically established levels and levels which have been manually readjusted in accordance with the setting of the manually adjustable signal, without losing the automatically adjustable signal.

Figure 4:
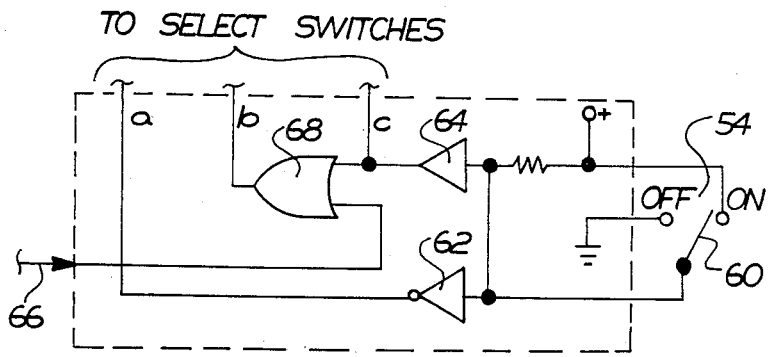
FIG. 4 is a more detailed circuit schematic of a portion of the system illustrated generally in FIG. 3.

FIG. 4 illustrates one embodiment of the portion of the auto setup circuit 12 which generates the three bit control word for controlling the states of the combiner circuit 22 of FIG. 3. In this embodiment, the bypass switch is shown as a single-pole, double-throw switch whose two contacts are connected to ground and to a positive supply voltage, representing low and high logic levels respectively. The toggle arm 60 of the switch 58 is connected to the inputs of inverting and non-inverting buffer amplifiers 62 and 64. By operating the switch 58 the input signal to these two buffer amplifiers can be switched between high and low logic levels. The outputs of the inverting and non-inverting amplifiers 62 and 64 are respectively connected to first and third lines of the bus which provides the control word for controlling the combiner circuit 22. Since the two amplifiers 60 and 62 have a common input signal, it follows that their output signals will always be logic inverses of one another. Consequently, the first and third bits of the control word will similarly be the logic inverse of one another, and will be solely dependent upon the position of the switch 58.

The second bit of the control word is dependent not only on the position of the switch 58, but also upon whether the auto setup system is in the process of setting the automatically adjustable control signals. This is indicated by a control line 66, which corresponds to the control line 42 in FIG. 2. Referring to the chart set forth previously, it is apparent that the second bit of the control word must be at a high logic level (logic "1") whenever either the third bit is high or the automatic setup system is not in the process of readjusting the control signals. To provide this logic signal, an OR gate 68 is provided which logically combines the output of the non-inverting amplifier 64 with the control signal 66 provided by the auto setup circuit. Whenever either of the inputs of the OR gate 68 are high, its output will similarly be high.

Accordingly, when the bypass switch 58 is in the "on" position, the three bits of the control word will automatically be forced to a "011" state. When the auto bypass switch 58 is in the "off" position, however, the first and third bits will be forced to states of "1" and "0", respectively, however the second bit may be either "0" or "1", depending upon the state of the control signal provided on line 66 by the auto setup system. If this control signal is at a low logic level, then the output of the OR gate 68, and hence the second bit of the control word, will also be low. If this control signal is high, however, then the second bit of the control word will similarly be high.

To briefly summarize, the auto setup system described includes not only the mechanism for automatically establishing the levels of all of the control signals necessary to preset the camera to its nominal status, but also includes a bank of potentiometers, one for each control signal. Each of these potentiometers will have associated therewith a switch (corresponding with the "tweak" switches 56 of FIG. 3) preferably located adjacent the associated potentiometer. Finally, there will be a single "bypass" switch located somewhere on the control panel. If the operator desires full manual adjustment of all of the setup controls for the camera, the bypass switch will be turned to the "on" position. In this case, the position of all of the other switches 56 is irrelevant, and the outputs of the various potentiometers exclusively controls the various setup adjustments for the camera. When auto setup is required, however, the "bypass" switch will be in the "off" position, whereby the auto setup system will contribute to the control of the TV camera. During initial establishment of the control signals provided by the auto setup system, the auto setup system provides signals which effectively disconnects the potentiometers from the circuit so that the auto setup system, alone, controls the TV camera. Thereafter, however, the origin of the control signals provided to the TV camera is dependent upon the positions of the various switches associated with the individual potentiometers. If a given switch is in a "on" position, then the associated potentiometer is active to "tweak", i.e., provide minor adjustment of, the automatically established level. If that same switch is moved to the "off" position, however, the potentiometer is effectively disconnected from the circuit and the automatically established level, alone, is provided to the camera. This permits great flexibility in selection of the operating mode of the camera and in setup of the various adjustments therefor.

Although the invention has been described with respect to a preferred embodiment, it will be appreciated that various rearrangements and alterations of parts may be made without departing from the spirit and scope of the present invention, as defined in the appended claims.

What is claimed is:

1. Apparatus for setting up a television camera in cooperation with a closed loop auto setup system which provides at least one setup control signal to the camera and, during an automatic setup operation, responds to at least one video signal provided by the camera to automatically adjust the level of the setup control signal, said apparatus comprising a manual control which permits manual variation of the level established by the auto setup system, and means for disabling the manual control during said automatic setup operation in such a manner that during said setup operation any setting of the manual control will not influence the level of the setup control signal.

2. Apparatus as set forth in claim 1, wherein said manual control includes means for providing a manually adjustable signal and combining means responsive to said manually adjustable signal and said setup control signal provided by said auto setup system for providing a modified setup control signal corresponding generally to said setup control signal provided by said auto setup system but varied therefrom in accordance with said manually adjustable signal, and wherein said disabling means includes means for causing said combining means to be unresponsive to said manually adjustable signal during said automatic setup operation whereby said modified setup control signal then substantially corresponds to said setup control signal, unaffected by said manually adjustable signal.

3. Apparatus as set forth in claim 1, wherein said manual control means comprises means for providing a manually adjustable signal, and means for combining having at least two inputs and responsive to the signals appearing at said inputs to provide a combined signal for application to said camera for setup thereof, and wherein said disabling means includes means coupling said manually adjustable signal and said auto setup signal to respective inputs of said means for combining, and said coupling means including means for decoupling said manually adjustable signal from said means for combining during said automatic setup operation.

4. Apparatus as set forth in claim 3, wherein said coupling means includes first switch means coupled between said means for providing a manually adjustable signal and said respective input of said means for combining, said switch means having open and closed states, and means for controlling the state of said first switch means.

5. Apparatus as set forth in claim 3 wherein said coupling means includes first switch means coupled between said means for providing said manually adjustable signal and one of said respective inputs of said means for combining, second switch means coupled between said auto setup system and said other respective input of said means for combining, said first and second switch means each having open and closed states, and means for controlling the states of said first and second switch means.

6. Apparatus as set forth in claim 5, wherein said means for controlling the states of said first and second switch means comprises means operable in a first mode wherein both said first and second switch means are closed whereby said combined signal is a combination of both said manually adjustable signal and said setup control signal provided by said auto setup system, and operable in a second mode wherein said first switch means is open and said second switch means is closed, whereby said combined signal then substantially corresponds to said setup control signal, unaffected by said manually adjustable signal.

7. Apparatus as set forth in claim 6, wherein said auto setup system includes means for causing said switch state controlling means to operate in said second mode during said automatic setup operation.

8. Apparatus as set forth in claim 6 wherein said means operable in said first and second modes includes means operable in a third mode as well as said first and second modes, said third mode being wherein said first switch means is closed and said second switch means is open, whereby said combined signal corresponds to said manually adjustable signal, unaffected by said setup control signal.

9. Apparatus as set forth in claim 8 wherein said means for combining having at least two inputs and responsive to said inputs to provide a combined signal comprises two resistances connected together in series betweeen said two inputs with any signal appearing at the junction of said resistances serving as said combined signal.

10. Apparatus as set forth in claim 9 wherein the one of said resistances coupled to the input to which said manually adjustable signal is applied has a resistance value which is much greater than the resistance value of the other of said resistances, whereby when said first and second switches are closed said combined signal corresponds generally to said setup control signal provided by said auto setup system, but is varied by a small amount therefrom in accordance with said manually adjustable signal.

11. Apparatus as set forth in claim 3 wherein said means for combining having at least two inputs and responsive to said inputs to provide a combined signal comprises two resistances connected together in series between said two inputs with any signal appearing at the junction of said resistances serving as said combined signal.

12. Apparatus for providing a control signal for adjusting a controlled device, comprising:
first means for providing an automatically adjustable control signal;
second means for providing a manually adjustable control signal; and
third means for combining said automatically adjustable control signal and said manually adjustable signal to provide a combined signal, and for providing said combined signal for use as said control signal for adjusting said controlled device, wherein said third means includes means for providing only said automatically adjustable control signal in place of said combined signal when said first means is adjusting said automatically adjustable control signal, whereby said control signal substantially corresponds to said automatically adjustable control signal during said automatic adjustment of said controlled device.

13. Apparatus as set forth in claim 12, wherein said third means includes means for adding together a signal proportionate to said automatically adjustable signal and a signal proportionate to said manually adjustable signal to provide a sum signal serving as said combined signal.

14. Apparatus as set forth in claim 13, wherein said second means comprises means for providing a control signal which is manually adjustable over a range which is substantially equal to the range of adjustment of said automatically adjustable signal, and wherein said adding means includes means for combining said proportionate manually adjustable control signal with said proportionate automatically adjustable control signal such that said combined signal is predominantly representative of said automatically adjustable signal, but is varied therefrom by a small amount in accordance with said manually adjustable signal.

15. Apparatus as set forth in claim 12, wherein said third means includes mode selection means selectively operable to cause either said combined signal or said automatically adjustable signal to be provided as said control signal for adjusting said controll device.

16. Apparatus as set forth in claim 12, wherein said third means include mode selection means selectively operable to provide either said combined signal or said manually adjustable signal as said control signal for adjusting said control device.

17. Apparatus as set forth in claim 12, wherein said third means includes mode selection means selectively operable to cause a selected one of said combined signal, said manually adjustable signal or said automatically adjustable signal to be provided as said control signal for adjusting said controlled device.

18. Apparatus as set forth in claim 17, wherein said first means includes means for providing a first signal representative of whether or not said means is in the process of automatically adjusting said automatically adjustable signal, and wherein said mode selection means includes means responsive to said first signal for placing said mode selection means into a mode whereby said automatically adjustable control signal, alone, is provided as said control signal for adjusting said controlled device, whereby said first means alone controls the said controlled device during said automatic adjustment.

* * * * *